US008077012B2

(12) United States Patent
Batra et al.

(10) Patent No.: US 8,077,012 B2
(45) Date of Patent: Dec. 13, 2011

(54) RFID DEVICE WITH FIRST CLOCK FOR DATA ACQUISITION AND/OR CALIBRATION OF SECOND CLOCK

(75) Inventors: Naresh Batra, Saratoga, CA (US); Robert Olah, Sunnyvale, CA (US); William Henry Bares, Los Gatos, CA (US)

(73) Assignee: Intelleflex Corporation, Santa Clara, CA (US)

( * ) Notice: Subject to any disclaimer, the term of this patent is extended or adjusted under 35 U.S.C. 154(b) by 1274 days.

(21) Appl. No.: 11/424,810

(22) Filed: Jun. 16, 2006

(65) Prior Publication Data

US 2008/0001744 A1  Jan. 3, 2008

(51) Int. Cl.
*H04Q 5/22* (2006.01)
(52) U.S. Cl. .......... 340/10.1; 340/572.1; 340/539.22; 340/10.5; 340/539.26; 455/85; 455/86
(58) Field of Classification Search .......... 340/10.5, 340/10.1, 10.33, 442, 447, 448, 539.26; 702/89, 702/106; 455/73–79; 342/42, 51, 30, 31
See application file for complete search history.

(56) References Cited

U.S. PATENT DOCUMENTS

| | | | |
|---|---|---|---|
| 5,212,373 A | 5/1993 | Fujioka et al. | 235/492 |
| 5,613,235 A | 3/1997 | Kivari et al. | 455/343 |
| 6,130,602 A | 10/2000 | O'Toole et al. | 340/10.33 |
| 6,473,607 B1 | 10/2002 | Shohara et al. | 455/343 |
| 6,512,478 B1 | 1/2003 | Chien | 342/357.09 |
| 6,721,289 B1 | 4/2004 | O'Toole et al. | 370/311 |
| 6,725,067 B1* | 4/2004 | Marx et al. | 455/574 |
| 6,804,503 B2 | 10/2004 | Shohara et al. | 455/343.4 |
| 7,230,987 B2* | 6/2007 | Demas et al. | 375/240.28 |
| 7,253,719 B2* | 8/2007 | Diorio et al. | 340/10.4 |
| 7,421,251 B2* | 9/2008 | Westwick et al. | 455/85 |
| 7,751,447 B2* | 7/2010 | Heinle et al. | 370/503 |
| 2002/0169009 A1 | 11/2002 | Reiner | 455/574 |
| 2003/0060185 A1 | 3/2003 | Fisher et al. | 455/344 |

(Continued)

FOREIGN PATENT DOCUMENTS

WO   WO 2005/013190   2/2005

OTHER PUBLICATIONS

International Preliminary Report on Patentability from PCT Application No. PCT/US07/13183 mailed on Dec. 31, 2008.

(Continued)

*Primary Examiner* — Hoi Lau
(74) *Attorney, Agent, or Firm* — Zilka-Kotab, PC

(57) ABSTRACT

A system according to one embodiment of the present invention includes a first clock signal generator generating a first clock signal at a first frequency, and a second clock signal generator generating a second clock signal at a second frequency that is higher than the first frequency. The first clock signal is used to calibrate the second clock signal generator. An RFID device according to another embodiment of the present invention includes a crystal controlled first clock signal generator generating a first clock signal at a first frequency, a second clock signal generator generating a second clock signal at a second frequency that is higher than the first frequency, and an activate circuit. The second clock signal generator is inactive until activated by the activate circuit. The first clock signal is used to calibrate the second clock signal generator. Methods are also presented.

40 Claims, 4 Drawing Sheets

U.S. PATENT DOCUMENTS

| | | | |
|---|---|---|---|
| 2003/0095008 A1* | 5/2003 | Kranz | 331/18 |
| 2003/0097302 A1* | 5/2003 | Overhultz et al. | 705/14 |
| 2004/0066280 A1 | 4/2004 | Pratt et al. | 340/10.2 |
| 2004/0214538 A1* | 10/2004 | Ballantyne et al. | 455/141 |
| 2005/0043068 A1 | 2/2005 | Shohara et al. | 455/574 |
| 2005/0206503 A1* | 9/2005 | Corrado et al. | 340/10.5 |
| 2005/0228294 A1* | 10/2005 | Yamaki | 600/478 |
| 2005/0270108 A1* | 12/2005 | Wilson et al. | 331/2 |
| 2005/0270222 A1* | 12/2005 | Vavik | 342/51 |
| 2006/0030353 A1 | 2/2006 | Jun | 455/550.1 |
| 2006/0077082 A1* | 4/2006 | Shanks et al. | 341/120 |
| 2006/0149984 A1* | 7/2006 | Yasumoto | 713/322 |
| 2006/0240798 A1* | 10/2006 | Jarosinski et al. | 455/343.1 |
| 2006/0261927 A1* | 11/2006 | Kelly et al. | 340/10.1 |
| 2007/0111671 A1* | 5/2007 | Baumgartner et al. | 455/69 |

OTHER PUBLICATIONS

International Search Report and Written Opinion from PCT Application No. PCT/US07/13183 mailed on Mar. 10, 2008.

* cited by examiner

RFID DEVICE WITH FIRST CLOCK FOR DATA ACQUISITION AND/OR CALIBRATION OF SECOND CLOCK

FIELD OF THE INVENTION

The present invention to device clocking, and more particularly, this invention relates to use of one clock signal for data acquisition and calibrating a second clock.

BACKGROUND OF THE INVENTION

The emerging RFID technology employs a Radio Frequency (RF) wireless link and ultra-small embedded computer chips to allow physical objects to be identified and tracked via these wireless "tags". It functions like a bar code that communicates to the reader automatically without needing manual line-of-sight scanning or singulation of the objects.

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

Utilizing an RFID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a reader, wherein a reader may read information stored on the tag.

Many RFID tags require a high frequency on-chip reference clock signal in order to decode incoming signals as well as generate responses. However, processing variations from wafer to wafer, and even across a wafer, result in one chip having a clock that runs at a different frequency than the clock of another chip. In present manufacturing operations, the frequency of the on-chip clock is calibrated at wafer sort. Particularly, its signal is calibrated against a known frequency from an external source. If the on-chip clock frequency is higher or lower than the external reference frequency, it is adjusted to be within the desired tolerances. Then the setting is permanently programmed into the chip. One drawback of this is that the procedure is performed at wafer sort, which requires extra handling of the chips, and thus increased expense. Another problem is that once the on-chip clock is calibrated, it cannot be recalibrated, at least not without great difficulty. Thus, if conditions change, even temperature, the clock may no longer have the desired frequency.

Methods of calibrating an on-chip clock using the incoming signal frequency as a baseline have also been proposed. However, the incoming signal frequency will typically vary from source to source, and may even be inaccurate itself.

SUMMARY OF THE INVENTION

A system according to one embodiment of the present invention includes a first clock signal generator generating a first clock signal at a first frequency, and a second clock signal generator generating a second clock signal at a second frequency that is higher than the first frequency. The first clock signal is used to calibrate the second clock signal generator.

An RFID device according to another embodiment of the present invention includes a crystal controlled first clock signal generator generating a first clock signal at a first frequency, a second clock generator generating a second clock signal at a second frequency that is higher than the first frequency, and an activate circuit. The second clock signal generator is inactive until activated by the activate circuit. The first clock signal is used to calibrate the second clock signal generator.

A method for taking and transmitting a sensor reading according to another embodiment of the present invention includes determining occurrence of a trigger condition based at least in part on a first clock signal, taking a sensor reading, and transmitting information about the sensor reading via a wireless link, wherein the transmitting is based on a second clock signal that has a higher frequency than the first clock signal.

A method for calibrating a clock signal on a device such as an RFID device according to another embodiment of the present invention includes generating a first clock signal at a first frequency, independently generating a second clock signal at a second frequency higher than the first frequency, and calibrating the second clock signal using the first clock signal.

An RFID system in which the present invention may be embodied includes a plurality of RFID tags and an RFID interrogator in communication with the RFID tags. Each tag may be coupled to an object, each tag storing information about the object to which coupled. Likewise, each tag may have a unique identifier, the identifier being correlated with information about the object in a database.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

Figure 1:
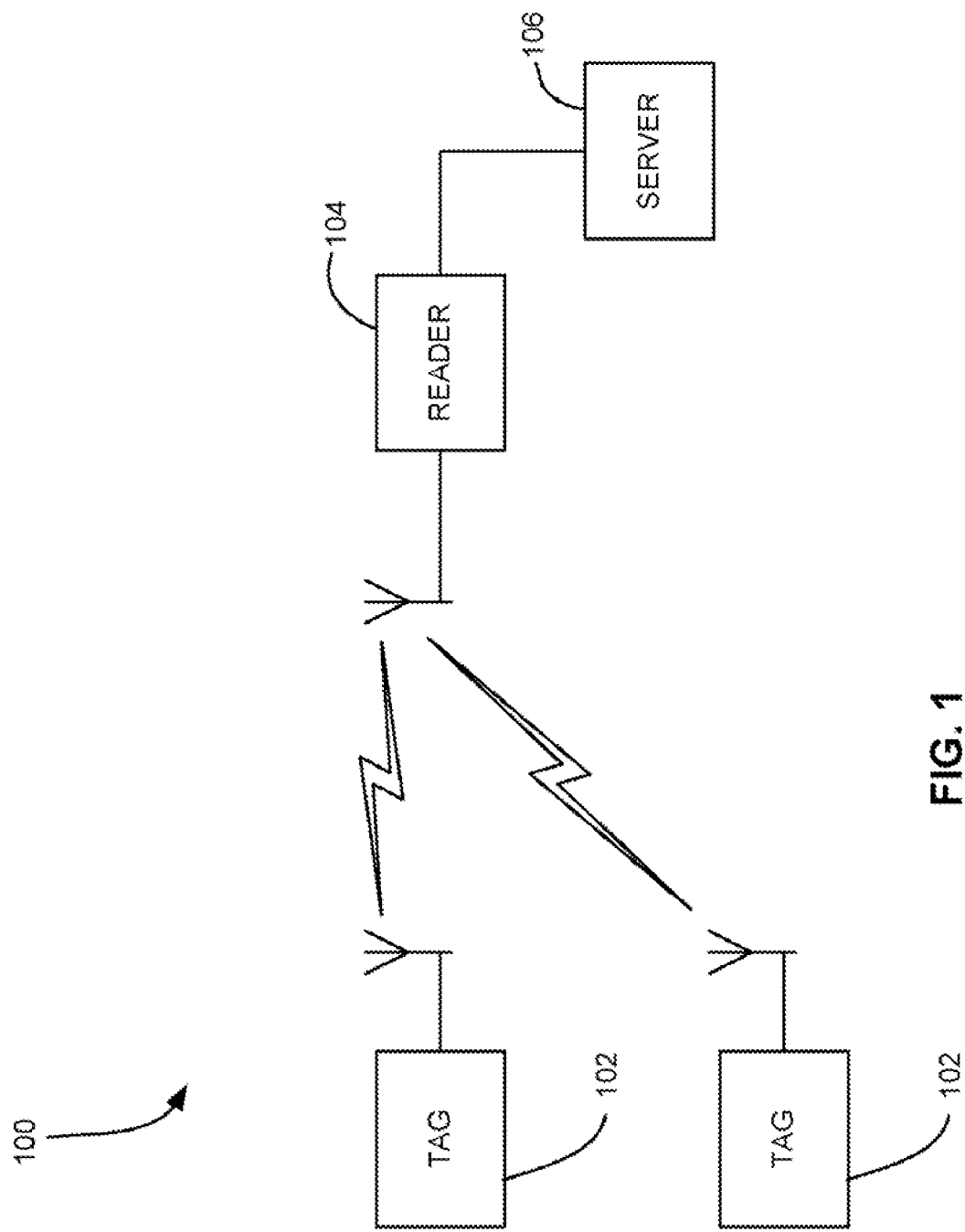
FIG. 1 is a system diagram of an RFID system according to one embodiment of the present invention.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

Many types of devices can take advantage of the embodiments disclosed herein, including but not limited to RFID systems and other wireless devices/systems. To provide a context, and to aid in understanding the various embodiments, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. In other words, various embodiments of the present invention can be implemented entirely in hardware, entirely in software, or a combination of the two. Examples of hardware include Application Specific Integrated Circuits (ASICs), printed circuits, monolithic circuits, reconfigurable hardware such as Field Programmable Gate Arrays (FPGAs), etc. The invention can also be provided in the form of a computer program product comprising a computer readable medium having computer code thereon that, when executed, causes a computer or reader to perform the methodology disclosed herein. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

A computer for storing and/or executing the code and/or performing the processes described herein can be any type of computing device, including a personal computer (PC), laptop PC, handheld device (e.g., personal digital assistant (PDA)), portable telephone, etc.

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

Utilizing an RFID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a user, wherein a user may read information stored within the tag and may additionally write information to the tag. For example, each tag may store information about the object to which coupled. A tagged object can be identified and located by identifying and locating the tag coupled to it.

As shown in FIG. 1, an RFID system 100 typically includes RFID tags 102, a reader or "interrogator" 104, and an optional server 106 or other backend system which may include databases containing information relating to RFID tags and/or tagged items. Each tag 102 may be coupled to an object. Each tag 102 includes a chip and an antenna. The chip includes a digital decoder needed to execute the computer commands that the tag 102 receives from the reader 104. The chip may also include a power supply circuit to extract and regulate power from the RF reader, a detector to decode signals from the reader; a backscatter modulator, a transmitter to send data back to the reader; anti-collision protocol circuits; and at least enough memory to store its unique identification code, e.g., Electronic Product Code (EPC).

The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes use din commerce, the EPC is divided into numbers that identify the manufacturer and product type. In addition, the EPC uses an extra set of digits, a serial number, to identify unique items. A typical EPC number contains:
1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each tag 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

Communication begins with a reader 104 sending out signals via radio wave to find a tag 102. When the radio wave hits the tag 102 and the tag 102 recognizes and responds to the reader's signal, the reader 104 decodes the data programmed into the tag 102. The information is then passed to a server 106 for processing, storage, and/or propagation to another computing device. By tagging a variety of items, information about the nature and location of goods can be known instantly and automatically.

Many RFID systems use reflected or "backscattered" radio frequency (RF) waves to transmit information from the tag 102 to the reader 104. Since passive )Class-1 and Class-2) tags get all of their power from the reader signal, the tags are only powered when in the beam of the reader 104.

The Auto ID Center EPC-Compliant tag classes are set forth below:
Class-1
Identify tags (RF user programmable, range ~3 m)
Lowest cost
Class-2
Memory tags (20 bit address space programmable at ~3 m range)
Security & privacy protection
Low cost
Class-3

Semi-passive tags (also called semi-active tags)
Battery tags (256 tags to 2M words)
Self-Powered Backscatter (internal clock, sensor interface support)
~100 meter range
Moderate cost
Class-4
Active tags
Active transmission (permits tag-speaks-first operating modes)
~30,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as semi-active or semi-passive), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal enables the tag permits. Class-3 tags to operate out to a free space distance of 100 meters or more compared with a Class-1 range of only about 3 meters. Note that semi-passive and active tags may also operate in passive mode, using only energy captured from an incoming RF signal to operate and respond.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. High-frequency (860 MHz to 960 MHz and 2.4 GHz to 2.5 GHz) tags offer increased read ranges and high reading speeds. One illustrative application of high frequency tags is automated toll collection on highways and interstates.

Figure 2:
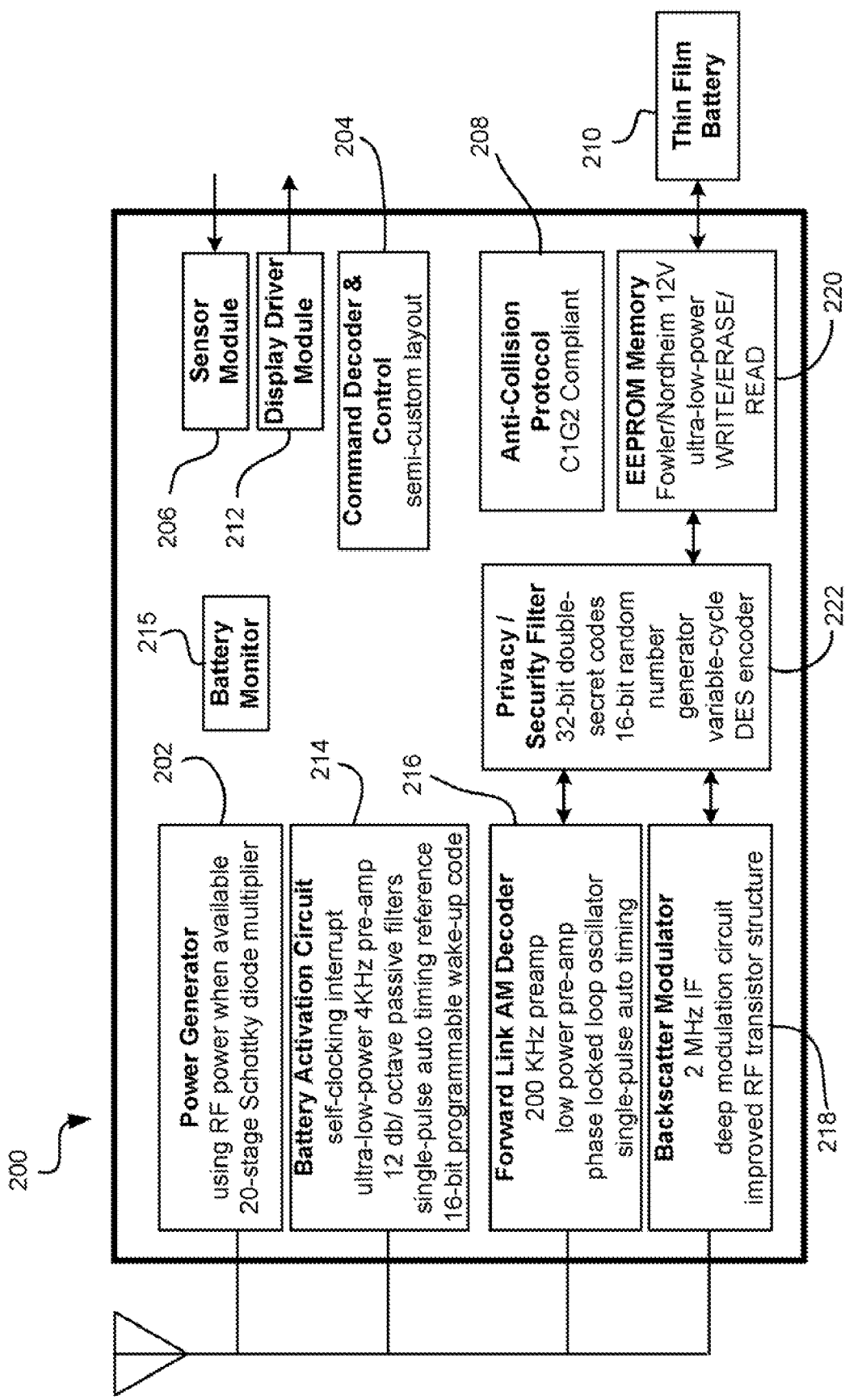
FIG. 2 is a system diagram for an integrated circuit (IC) chip for implementation in an RFID tag according to one embodiment of the present invention.

Embodiments of the present invention are preferably implemented on or in conjunction with a Class-3 or higher Class chip (processor). FIG. 2 depicts a circuit layout of a Class-3 chip 200 according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 200 includes several industry-standard circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A battery activation circuit 214 is also present to act as a wake-up trigger. In brief, many portions of the chip 200 remain in hibernate state during periods of inactivity. A hibernate state may mean a low power state, or a no power state. The battery activation circuit 214 remains active and processes incoming signals to determine whether any of the signals contain an active command. If one signal does contain a valid activate command, additional portions of the chip 200 are wakened from the hibernate state, and communication with the reader can commence. In one embodiment, the battery activation circuit 214 includes an ultra-low power, narrow-bandwidth preamplifier with an ultra low power static current drain. The battery activation circuit 214 also includes a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 tag battery 210.

A battery monitor 215 can be provided to monitor power usage in the device. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A memory cell, e.g., EEPROM, is also present. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this will permit designing of tags to operate at maximum range even when WRITE and ERASE operations are being performed. In other embodiments, the WRITE and ERASE currents may be higher or lower, depending on the type of memory used and its requirements.

The module 200 may also incorporate a highly-simplified, yet very effective, security encryption circuit 222. Other security schemes, secret handshakes with readers, etc. can be used.

Only four connection pads (not shown) are required for the chip 200 to function: Vdd to the battery, ground, plus two antenna leads to support multi-element omni-directional and isotropic antenna. Sensors to monitor temperature, shock, tampering, etc. can be added by appending an industry-standard I²C or SPI interface to the core chip.

It should be kept in mind that the present invention can be implemented using any type of tag, and the circuit 200 described above is presented as only one possible implementation.

In preferred RFID embodiments, including passive tags and battery assisted passive tags, the RFID devices are normally in the "sleep" or "hibernate" mode and wake up only when interrogated by a reader. The master clock is preferably also powered down when in the sleep mode to save power. To support some upcoming RFID standards, the master RFID clock needs to operate at a high speed and it needs to start operating upon initialization by the activation circuit based on reader command. However, processing variations and environmental changes result in master clock frequencies that vary from tag to tag, and change in the tags themselves depending on environmental conditions such as temperature. This is particularly so where the master clock generation circuitry is powered down and then activated periodically by the activate circuit.

Figure 3:
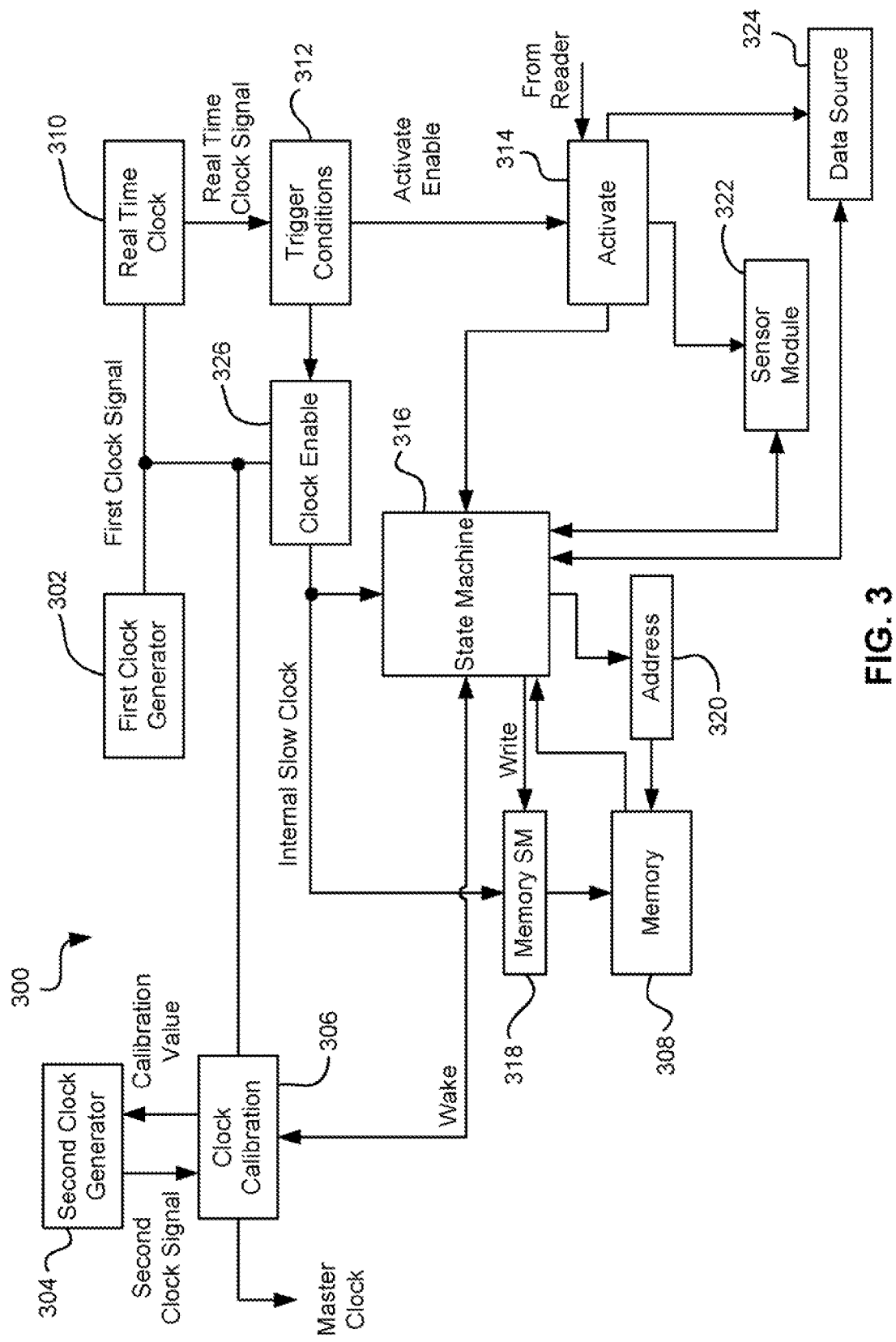
FIG. 3 is a system diagram of one embodiment of the present invention.

FIG. 3 illustrates a system 300 according to one embodiment of the present invention. This system 300 may be integrated into an RFID tag or other device. AS shown, the system 300 includes a first clock signal generator 302 that generate a first clock signal at a first frequency. A second clock signal generator 304 generates a second clock signal at a second frequency that is higher that the first frequency. The first clock signal is used to calibrate the second clock signal generator 304.

The first clock signal generator 302 may be any clock signal generation circuit. In a preferred embodiment, the first clock signal generator 302 includes an oscillator coupled to a crystal. The crystal controlled oscillator provides a periodic signal that is very accurate. Also, because crystal oscillators are very accurate, e.g., to within +/−20 ppm, each crystal has substantially identical first clock signal frequencies.

The first clock signal from the first clock signal generator 302 is preferably set at a lower frequency than the second frequency to conserve power. Illustrative lower frequencies are in the range of less than about 1 MHz, and preferably less than about 100 KHz. Of course frequencies higher than 1 MHz can be employed in the present invention. Various components of the system or host may operate using the first clock signal as the reference clock signal for their operations. In one illustrative embodiment, the first clock signal has a frequency of about 32 KHz. The 32 Khz clock also acts as a real time 24 hour clock to take data at a predefined time of the day.

The second clock signal generator 304 may be any clock signal generation circuit. In a preferred embodiment, the second clock signal generator 304 includes a ring oscillator, and capacitors that can be attached or detached to increase or decrease the frequency of the second clock signal. The second clock signal from the second clock signal generator 304 can be, or be used to generate, the master clock signal that is used for various purposes.

As mentioned above, the first clock signal may be used to calibrate the second clock signal generator 304. The second clock signal generator 304 can thus be calibrated for process variation, as well as to compensate for environmental effects. Because the first clock signal is crystal controlled and thus more accurate, it can be used to calibrate the higher frequency second clock signal generator 304 to achieve more accuracy, yet minimizing long term power consumption on the device. In RFID embodiments, the resulting higher accuracy of the calibrated master clock results in more robust communication with a reader.

Figure 4:
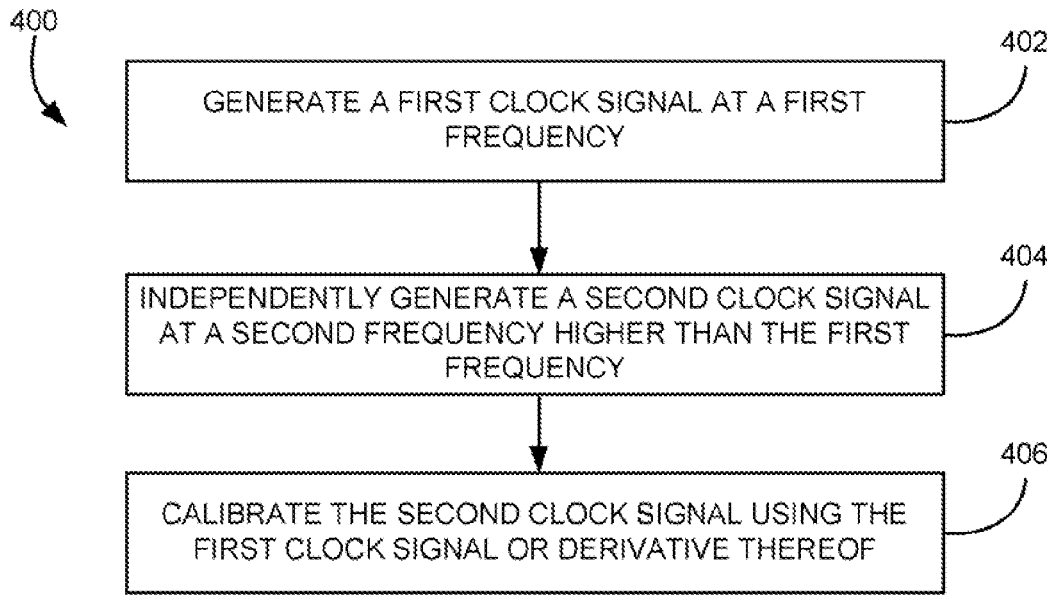
FIG. 4 is a flow diagram of a general method for calibrating a clock signal on a device according to one embodiment of the present invention.

FIG. 4 depicts a general method 400 for calibrating a clock signal on a device such as an RFID device. In operation 402, a first clock signal is generated at a first frequency. In operation 404, a second clock signal is independently generated at a second frequency higher than the first frequency. In operation 406, the second clock signal is calibrated using the first clock signal. This step is contemplated to include using the raw first clock signal and/or derivatives thereof.

With reference to FIG. 3, a clock calibration portion 306 may be used to calibrate the second clock signal generator 304. The clock calibration portion 306 receives the first clock signal and compares it to the second clock signal. Because the second clock signal is at a higher frequency, the second clock signal may be divided down to about the same frequency as the first clock signal, e.g., using a phase lock loop (PLL). In some embodiments, both the first and second clock signals may be divided down. In a variation, the first clock signal may be multiplied up to about the frequency of the second clock signal, e.g., using a PLL. In further embodiments, combinations of these operations may be performed in order to create signals amenable to comparison.

In one embodiments, the clock calibration portion 306 generates a digital calibration value based on the comparison of the first and second clock signals. The calibration value may be a digital code e.g., 2-20 bits, which specifies a calibration setting for the second clock signal generator 304. For example, the calibration value may indicate which capacitors in the second clock signal generator 304 are active, thereby increasing or decreasing the frequency of the second clock signal. The signal from the second clock signal generator 304, as calibrated by the calibration value, may again be compared to the first clock signal and a new calibration value generated. Several iterations may be performed if the device is so programmed. For example, a set number of iterations may be performed, or iterations may be performed until the second clock signal is within a desired tolerance relative to the first clock signal.

Once the second clock signal generator 304 is calibrated, the second clock signal is then used as, or to generate, the master clock for device operations such as decoding incoming signals and backscattering, clocking the state machine, etc. Note that the master clock may be used in its raw state, or it may be divided down or multiplied up as required by various components and/or processes of the chip and/or host device. An illustrative master clock frequency range is greater than about 1 MHz. One master clock frequency provided by way of nonlimiting example only is 2.88 MHz +/−2%.

The digital calibration value can be stored in system memory 308. Upon powering up the second clock signal generator 304 from a hibernate state, the stored calibration value my be returned to the clock calibration portion 306 and used as the permanent, temporary, or initial setting of the second clock signal generator 304. In the latter two cases, the clock signal may, for example, be recalibrated at specified intervals, upon expiration of some time period, upon instructions to recalibrate from a reader, upon detecting a change on the chip, upon detecting occurrence of some event or criterion such as a change in an environmental condition, etc. As will be understood by those skilled in the art, the ability to recalibrate the master clock (in those embodiments which allow recalibration) is a great advantage.

The first and second clock signal generators 302, 304 may be present on a single chip, or may be present in different chips on the same device. Thus, in one embodiment of the present invention, an on-chip crystal-controlled oscillator signal is used to calibrate an on-chip master clock signal generator. The lower frequency of the crystal controlled clock signal minimizes battery consumption. The higher frequency of the master clock signal enables compliance with new RFID standards.

The first clock signal generator 302 may drive a real time clock 310. The first clock signal may be set at a frequency reflecting the desired time constant. Or the first clock signal can be divided down or multiplied up to provide the desired frequency to drive the real time clock 310. The real time clock 310, in turn, may be used to provide seconds, hours, days, months, etc. for triggering events and activities as well as for logging when such events or activities occurred. Various components of the system or host may operate using the real time clock signal as the reference clock signal for their operations. An illustrative crystal controlled real time clock operates at 32 KHz. The master clock signal may be at a higher frequency.

Because the real time clock signal is based on the crystal controlled first clock signal, the real time clock signal may be used to calibrate the second clock signal generator 304 and thus the master clock signal, which may in turn be used during data collection, communication with the reader, etc.

The real time 310 may also be useful for prompting devices to perform some action. For example, RFID devices are usually in a low power hibernate state, i.e., only a few components of the device are active and the rest are powered down. A particular user may want to wake up the RFID device at some predefined time or interval so that it will perform an action such as take a temperature reading.

The real time clock may be continuously active, i.e., does not hibernate. In embodiments where the real time clock is always on, it can be used to define trigger conditions that cause the host device to perform some action. The crystal controlled real time clock and trigger conditions portion 312 can thus be used to schedule tag activation (out of hibernation) for data acquisition and other activities. Trigger condition can be set intervals (e.g., every hour, every day, etc.), random intervals, etc. The trigger conditions may also initiate taking readings after a period of time has elapsed. For example, after a week has elapsed from some start time, a daily routine begins. The device can also be programmed to only perform actions for a specified period of time, such as take reading from the third through the eighth day from a designated start time. The length of time that the action is performed can be programmed into the RFID device, and can be based on a number of clock cycles from the relevant clock, upon stabilization of a sensor output, etc.

Upon detecting occurrence of a trigger condition, the trigger conditions portion 312 may send an activate enable command to an activate circuit 314. The activate circuit in turn instructs various components of the device, such as the state machine 316 to exit the hibernate state and become active. The activate circuit 314 may also instruct a sensor 322 and/or other data source 324 to active.

An RFID device can also respond to a manual request to perform some action such a take a reading, e.g., upon receipt of an instruction from a reader, upon manual activation by a user e.g., by pushing a button on the host device, etc. Thus, RFID devices according to various embodiments can be activated in several ways, for example one or more of: upon occurrence of a trigger condition, upon receiving an activate command from an interrogator, upon receiving manual input, and combinations thereof.

Upon performing a sensor reading, for example, the reading may be stored in the memory 308 along with a time stamp. In the illustrative embodiment shown, the state machine 316 writes to the memory 308 via select and address modules 318, 320. All data may be stored; or only data meeting a certain criteria may be stored, for example, humidity or temperature readings falling outside of a predefined range. Such embodiments conserve both power and memory space, as only pertinent information will be recorded after each action. Alternatively, or in conjunction with the foregoing, the reading can be immediately, delayedly, or periodically transmitted via wired or wireless link, etc.

After performing the action and any consequent actions, the device preferably returns to a hibernate state.

The RFID device can be queried by a reader for retrieval of readings and other data stored in the memory 308.

Because, in some embodiments, all components necessary to take and store a sensor or perform some other activity may use the first clock signal or real time clock signal as their reference signal, the second clock signal generator 304 may not activate during taking and storing a sensor reading or performing some activity. Thus, considerable power can be conserved on the device. In the embodiment shown, upon occurrence of a trigger condition, the trigger conditions portion 312 engages a clock enable portion 326 that either generates an internal slow clock of a desired frequency, or passes the first clock signal or real time clock signal through. The clock enable portion 326 can also or alternatively be initiated by the activate circuit 314. Using the first clock signal or real time clock signal also minimizes redundant activation, e.g., to calibrate the master clock.

In one embodiment, a slow reference clock generated from the crystal controlled first clock signal is used by the state machine and/or other components and/or processes of the RFID device. Using a slow reference clock rather than the faster master clock reduces power consumption. Accordingly, some embodiments of the present invention do not require the master clock signal to perform an action upon occurrence of a trigger condition. Accordingly, the master clock signal need not be generated for some actions, such as taking temperature readings. This consequently saves power.

Figure 5:
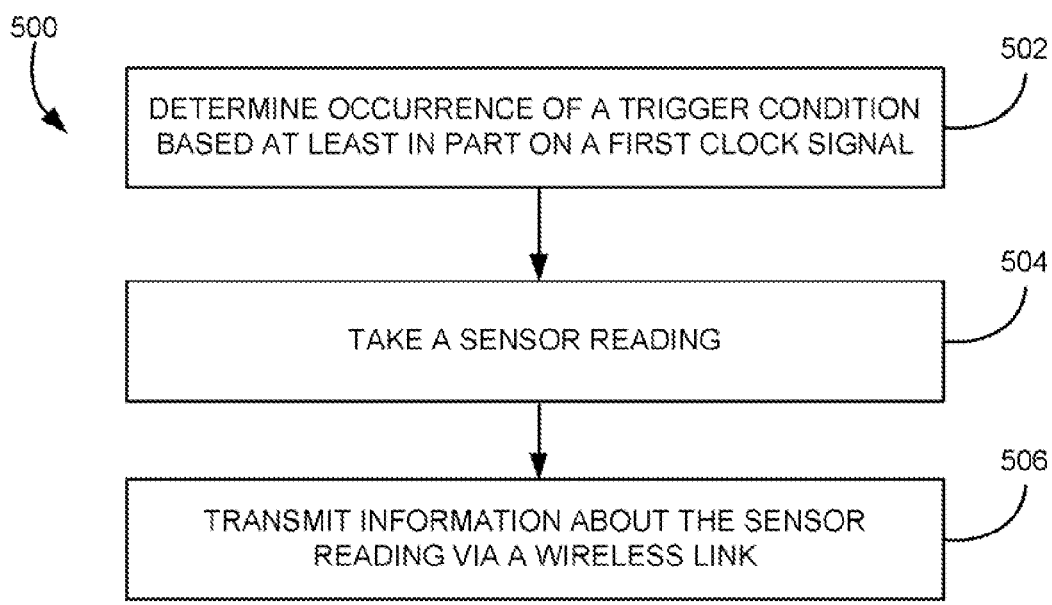
FIG. 5 is a flow diagram of a general method for taking and transmitting a sensor reading according to one embodiment of the present invention.

FIG. 5 illustrates a method 500 for taking and transmitting a sensor reading according to one embodiment of the present invention. In operation 502, occurrence of a trigger condition is determined based at least in part on a first clock signal. In operation 504, a sensor reading is taken. In operation 506, information about the sensor reading is transmitted via a wireless link, where the transmitting is based on a second clock signal that has a higher frequency than the first clock signal.

EXAMPLE 1

During tag initialization, the real time of the day is programmed into the chip and the real time clock is initialized by the reader. The real time clock continues to run at ultra-low power, even when the tag hibernates. At predefined real times or predefined intervals, the RFID chip wakes up, starts the second clock signal generator to generate a master clock signal, takes a reading using the sensor, stores the reading in the chip EEProm memory, and goes back to sleep.

EXAMPLE 2

Assume an RFID device is coupled to a cooler with human transplantable organs stored therein, and that is to be shipped across the country. Prior to departure, the RFID device is programmed to take and store temperature readings every 60 seconds due to the fragile nature of the organs. The real time clock generated from the first clock signal is used to determine when each 60 second interval has elapsed. Upon arrival at the destination, the manifest (e.g., contents of the cooler, origin, etc.) and temperature profile data can be retrieved by a reader.

EXAMPLE 3

The real time clock continuously runs at ultra-low power, even when the tag hibernates. Upon occurrence of a trigger condition, the tag activates and takes a temperature reading. No master clock signal is generated. Upon receiving a query for historical temperature data from a reader, the tag takes a present temperature reading, and if the reading is outside a predetermined range, recalibrates the second clock generator. The historical data is retrieved from memory and transmitted to the reader.

One skilled in the art will appreciate how the systems and methods presented herein can be applied to a plethora of scenarios and venues, including but not limited to dock doors, tollbooths, etc. Accordingly, it should be understood that the systems and methods disclosed herein may be used with objects of any type and quantity.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system embodied in a Radio Frequency Identification (RFID) device, comprising:
 a first clock signal generator generating a first clock signal at a first frequency;

a second clock signal generator generating a second clock signal at a second frequency that is higher than the first frequency;

a real time clock portion receiving a signal from the first clock signal generator, the real time clock portion generating a real time clock signal based on the first clock signal; and a sensor for taking a sensor reading at a rate of the real time clock signal, wherein the first clock signal is used to calibrate the second clock signal generator, and further comprising logic for generating a digital calibration value when the second clock signal generator is calibrated using the first clock signal, the digital calibration value indicating a calibration setting of the second clock signal generator, wherein the second clock signal generator is used to modulate communication of the RFID device.

2. The system as recited in claim 1, wherein the first and second clock signal generators are present on a single chip.

3. The system as recited in claim 1, wherein the first clock signal generator is crystal controlled.

4. The system as recited in claim 1, wherein the real time clock signal has a different frequency than the first clock signal.

5. The system as recited in claim 1, wherein an action is performed at a specified time based on the real time clock signal.

6. The system as recited in claim 5, wherein the action includes taking the sensor reading.

7. The system as recited in claim 6, further comprising a memory, wherein the sensor reading is stored in the memory.

8. The system as recited in claim 7, wherein the sensor reading stored in the memory is transmitted to a reader via wireless link.

9. The system as recited in claim 6, further comprising an activate circuit, wherein the second clock signal generator is inactive until activated by the activate circuit, wherein the sensor reading is taken without activating the second clock signal generator.

10. The system as recited in claim 1, further comprising an activate circuit, wherein the second clock signal generator is inactive until activated by the activate circuit.

11. The system as recited in claim 10, wherein the first clock signal generator is continuously active while the system is in a hibernate state.

12. An RFID system, comprising:
a plurality of RFID devices as recited in claim 1; and
an RFID reader in communication with the RFID devices.

13. A Radio Frequency Identification (RFID) device, comprising:
a crystal controlled first clock signal generator generating a first clock signal at a first frequency;
a second clock signal generator generating a second clock signal at a second frequency that is higher than the first frequency; and
an activate circuit;
a sensor for taking a sensor reading at a rate of a real time clock signal; and
logic for determining occurrence of a trigger condition based at least in part on the first clock signal,
wherein the second clock signal generator is inactive until activated by the activate circuit,
wherein the first clock signal is used to calibrate the second clock signal generator,
logic for generating a digital calibration value when the second clock signal generator is calibrated using the first clock signal, the digital calibration value indicating a calibration setting of the second clock signal generator, wherein the second clock signal generator is used to modulate communication of the RFID device, wherein an action is performed upon determining the occurrence of the trigger condition, wherein the action is performed without activating the second clock signal generator, wherein the second clock signal generator is used to modulate communication of the RFID device.

14. The device as recited in claim 13, wherein the first and second clock signal generators are present on a single chip.

15. The device as recited in claim 13, further comprising a real time clock portion receiving the first clock signal from the first clock signal generator, the real time clock portion generating the real time clock signal based on the first clock signal.

16. The device as recited in claim 15, wherein the action is performed at a specified time based on the real time clock signal.

17. The device as recited in claim 16, wherein the action includes taking the sensor reading.

18. The device as recited in claim 17, further comprising a memory, wherein the sensor reading is stored in the memory.

19. The device as recited in claim 18, wherein the sensor reading stored in the memory is subsequently transmitted to a reader via wireless link.

20. The device as recited in claim 13, wherein the first clock signal generator is continuously active.

21. An RFID system, comprising:
a plurality of RFID devices as recited in claim 13; and
an RFID reader in communication with the RFID devices.

22. A method for taking and transmitting a sensor reading, the method comprising:
generating a first clock signal at a first frequency;
generating a second clock signal at a second frequency that is higher than the first frequency;
wherein the first clock signal is used to calibrate a generator of the second clock signal generator,
wherein the second clock signal generator is used to modulate communication of the RFID device;
generating a digital calibration value when the second clock signal generator is calibrated using the first clock signal, the digital calibration value indicating a calibration setting of the second clock signal generator;
determining occurrence of a trigger condition based at least in part on the first clock signal;
taking a sensor reading at a rate of a real time clock signal in response to the occurrence of the trigger condition, the real time clock signal being based on the first clock signal; and
transmitting information about the sensor reading via a wireless link, wherein a modulation of the transmitting is based on a second clock signal that has a higher frequency than the first clock signal.

23. The method as recited in claim 22, further comprising storing the sensor reading in memory.

24. The method as recited in claim 22, wherein the first and second clock signals are independently generated by first and second clock signal generators.

25. The method as recited in claim 24, wherein the first and second clock signal generators are present on a single chip.

26. The method as recited in claim 24, wherein the first clock signal generator is crystal controlled.

27. The method as recited in claim 24, wherein the first clock signal is used to calibrate the second clock signal generator.

28. The method as recited in claim 22, further comprising activating inactive circuitry upon determining occurrence of the trigger condition.

29. The method as recited in claim 22, wherein the sensor reading is stored in memory, wherein the information about the sensor reading is transmitted upon receiving a request from a remote reader.

30. A method for taking a sensor reading on a Radio Frequency Identification (RFID) device, the method comprising:
generating a first clock signal at a first frequency;
independently generating a second clock signal at a second frequency higher than the first frequency;
calibrating the second clock signal using the first clock signal;
taking a sensor reading at a rate of a real time clock signal, wherein the first clock signal is used to calibrate a generator of the second clock signal generator;
generating a digital calibration value when the second clock signal generator is calibrated using the first clock signal, the digital calibration value indicating a calibration setting of the second clock signal generator.

31. The method as recited in claim 30, wherein the first clock signal is crystal controlled.

32. The method as recited in claim 30, further comprising storing the digital calibration value in memory, and using the digital calibration value to set the second clock signal generator frequency upon subsequent initializations of the second clock signal generator.

33. The method as recited in claim 30, wherein the first and second clock signals are independently generated by first and second clock signal generators.

34. The method as recited in claim 30, further comprising determining occurrence of a trigger condition based at least in part on the first clock signal; taking the sensor reading in response to the occurrence of the trigger condition; storing the sensor reading in a memory; and
transmitting information about the sensor reading via a wireless link, wherein the transmitting is based on the second clock signal.

35. The method as recited in claim 33, wherein the second clock signal generator is inactive until activated by the activate circuit, and further comprising taking a sensor reading without activating the second clock signal generator.

36. The method as recited in claim 22, wherein the sensor reading is taken upon occurrence of the trigger condition.

37. The system as recited in claim 1, wherein calibration of the second clock signal generator does not affect a frequency of the first clock signal.

38. The method as recited in claim 30, wherein calibration of the second clock signal generator does not affect a frequency of the first clock signal.

39. The system as recited in claim 1, wherein the second clock signal generator operates continuously when the system is in use.

40. The method as recited in claim 30, wherein the first and second clock signal are generated continuously when the RFID device is in use.

* * * * *

UNITED STATES PATENT AND TRADEMARK OFFICE
CERTIFICATE OF CORRECTION

| | |
|---|---|
| PATENT NO. | : 8,077,012 B2 |
| APPLICATION NO. | : 11/424810 |
| DATED | : December 13, 2011 |
| INVENTOR(S) | : Batra et al. |

Page 1 of 1

It is certified that error appears in the above-identified patent and that said Letters Patent is hereby corrected as shown below:

In column 1, line 7, --relates-- should be added between "invention" and "to".
In column 2, line 6, --signal-- should be added between "clock" and "generator".
In column 4, line 7, "RF reader, a detector" should be replaced with --RF reader; a detector--.
In column 4, line 18, "use din" should be replaced with --used in--.
In column 4, line 54, "passive )Class-1" should be replaced with --passive (Class-1--.
In column 4, line 60, "Identify" should be replaced with --Identity--.
In column 5, line 2, "256 tags" should be replaced with --256 bits--.
In column 5, line 62, "active" should be replaced with --activate--.
In column 5, line 66, "ultra-low power" should be replaced with --ultra-low-power--.
In column 6, line 34, "antenna" should be replaced with --antennas--.
In column 6, line 58, "AS" should be replaced with --As--.
In column 6, line 59, "generate" should be replaced with --generates--.
In column 6, line 62, "that" should be replaced with --than--.
In column 7, line 56, "embodiments" should be replaced with --embodiment--.
In column 7, line 59, a --,-- should be added between "code" and "e.g.,".
In column 8, line 18, "my" should be replaced with --may--.
In column 8, line 56, --clock-- should be added between "time" and "310".
In column 9, line 20, "active" should be replaced with --activate--.
In column 9, line 22, "such a take" should be replaced with --such as take--.
In column 9, line 47, --reading-- should be added between "sensor" and "or".

Signed and Sealed this
Seventeenth Day of April, 2012

David J. Kappos
*Director of the United States Patent and Trademark Office*